United States Patent [19]
Miller

[11] Patent Number: 5,832,520
[45] Date of Patent: Nov. 3, 1998

[54] AUTOMATIC FILE DIFFERENCING AND UPDATING SYSTEM

[75] Inventor: William A. Miller, Gualala, Calif.

[73] Assignee: Miller, Call, Plauck and Miller, Portola Valley, Calif.

[21] Appl. No.: 754,486

[22] Filed: Nov. 22, 1996

[51] Int. Cl.⁶ .................................................. G06F 17/30
[52] U.S. Cl. .......................................................... 707/203
[58] Field of Search ............................................ 707/203

[56] References Cited

U.S. PATENT DOCUMENTS

| | | | |
|---|---|---|---|
| 5,278,979 | 1/1994 | Foster et al. | 707/203 |
| 5,418,945 | 5/1995 | Carter et al. | 707/8 |
| 5,604,853 | 2/1997 | Nagashima | 707/540 |
| 5,623,656 | 4/1997 | Lyons | 707/10 |
| 5,644,709 | 7/1997 | Austin | 395/187.01 |

OTHER PUBLICATIONS

Cormen, et al., *Introduction to Algorithms*, The MIT Press (1990).
Pocket Soft, Inc., White Paper re .RTPatch Professional Binary Update System, from the World Wide Web (http://www.pocketsoft.com) (Nov. 14, 1996).
"Comparing and Merging Files", from the World Wide Web (Jun. 8, 1996).

*Primary Examiner*—Wayne Amsbury
*Attorney, Agent, or Firm*—Townsend and Townsend and Crew LLP

[57] ABSTRACT

A method and file structure for generating an efficient difference files from and old file and a new file so that a difference file can be transmitted to a second computer system where the difference file and a duplicate of the old file can quickly be used to create a copy of the new file is disclosed. A differencing process compares an old file and a new file to generate a difference file in which the old file is used as a database of byte strings. The differencing process reads strings of data from the new file, searches for the existence of those strings in the old file, and notes the locations in the old file in which strings in the new file are found and stores in a difference file an indication of the location where a matching string is found and an indication of the length. A specific file structure for the difference file is disclosed.

28 Claims, 13 Drawing Sheets

COPY COMMAND FORMATS

INSERT COMMAND FORMATS

RAW DIFF FILE DURING CONSTRUCTION OF OISD

AUTOMATIC FILE DIFFERENCING AND UPDATING SYSTEM

BACKGROUND OF THE INVENTION

This application claims the benefit of a provisional application Ser. No. 60/021,457, filed Jul. 3, 1996 now pending filed with a source code appendix consisting of 22 pages. The appendix contains program source code in the C++ programming language for software modules that embody aspects of the current invention.

The present invention relates to the field of data files used by computers. More specifically, the present invention relates to a system for creating, updating or revising large computer files by using only a small file containing indications of the differences between the large computer files and a preexisting computer file.

The present invention is motivated in part by changes that have been occurring in the personal computer industry over the last several years. Increases in performance and decreases in cost have led to a proliferation of computer equipment in homes and offices. This computer equipment has in turn spawned a burgeoning market for software modules that cause the equipment to operate in a desired manner. In recent years, the software modules have become larger and larger as the price of computer memory and the storage space needed to hold these software modules have become cheaper and cheaper. This has allowed for the development and sale of far more complex executable program codes to accomplish various functions such as word processing, spreadsheets, multimedia or any other use for a computer. In addition to executable files, more and more complex text and multimedia files, as well as database files, are commonly being used and distributed or archived in home and office computer systems.

These large files are distributed from software manufacturers to users via a number of different means, including being preloaded on a computer's hard drive before the computer is purchased, being shipped on a fixed medium such as a floppy disk or CD ROM, or being distributed through a transmission medium such as a dial-up telephone service, a BBS, or the Internet.

It is the nature of computer software and other large files that it is often desirable to update or revise files in order to correct errors or add features. Sometimes these revisions may be relatively minor, involving changes in only a small percentage of the data that makes up the file.

One obstacle to the frequent revision of large computer files by a manufacturer is the cost of delivering the updated file to the user. If an entire new revised file must be delivered, the amount of data can be substantial. Large files typically are as large as ten million characters (10 Megabytes) or larger. Distribution of such files on floppy disk can require a relatively large amount of disk space. Distribution of such large files over a medium such as the Internet can take an undesirably long time from the point of view of the customer and can consume a large amount of server resources from the point of view of the file provider.

One solution to the problem of distributing large computer files is use of compression. A number of standard compression algorithms are in existence and are commonly used today. These algorithms typically achieve compression of a large executable file down to between 40% to 60% of its original file size and can compress some types of text files even further, thereby reducing the transaction costs of shipping the file. However, for very large computer files or collections of files, even a compressed file reduced to 40% still represents a substantial transmission cost.

Another method useful for transmitting updated files is using a technique known as a differencing program or comparator program to compare an old file to a new revised file in order to determine how the files differ. One such file system is distributed as part of the GNU UNIX-like operating system through tools referred to as diff and patch and described in standard GNU documentation. The described system discusses a way to use a differencing program to generate a patch file, and then using that patch file in combination with the old file to generate a newly revised file. While the GNU revision system has some applications within the UNIX-like operating system within which it was developed, it has not been generalizable in the new environment of personal computer systems. The most commonly available versions of the system are limited to text files, and achieve only limited compression. These programs cannot effectively handle files where a number of fairly complex changes have occurred, such as a number of block moves or random shuffling of text strings. These programs also do not produce the smallest patch file possible.

What is needed is a method and system for generating a difference file from an old file and a new file, where that difference file indicates, in minimal number of bytes, changes between the old file and the new file. The needed system would allow users to then transmit the difference file to a second computer system or to a backup or archive storage system (system 2), and to use that difference file and the old file along with a decoding process to generate a newly revised file. The difference file could also be stored locally, allowing a number of versions of the same file to be saved without duplicating redundant information. Ideally, the difference file would be the smallest possible difference file, achieving compression density of perhaps 10% or less of the original file, even with a moderate number of changes between the two files.

SUMMARY OF THE INVENTION

The present invention comprises a software system with several components, a method, and a file structure for generating very efficient difference files (sometimes abbreviated DIFF file) from an old file and a new file so that a difference file can be transmitted to a second computer system where the difference file and a duplicate of the old file can quickly be used to create a copy of the new file, duplicating the new file as it existed on the first computer system. The difference file could also be stored locally to the first computer system, allowing the new file to be duplicated from the old file without storing the new file.

According to the present invention, a differencing process on a first computer system compares an old file and a new file to generate a difference file. In this process, the old file is used essentially as a database of byte strings. The differencing process reads strings of data from the new file and searches for the existence of those strings in the old file. The differencing process notes the locations in the old file in which strings in the new file are found and stores in a difference file an indication of the location where a matching string is found and an indication of the length of the matching string found in the old file. This information is stored in the difference file in a copy command. When the differencing process encounters strings of characters in the new file that are not found in the old file, the differencing process adds those strings to an insert database and adds an indication in the difference file of the location in the insert database where the strings can be found and the length of the string. This location and length are stored in an insert command.

According to a specific embodiment of the invention, the differencing process, upon opening the old file, creates an index (or hash table) of all of the character strings of predetermined length found in the old file, along with the locations at which those character strings were found, in order to facilitate searching for character strings from the new file. According to a further embodiment, the index (or hash table) is created only if the differencing process detects that there is sufficient memory on the first computer to hold the index.

The present invention also comprises a file structure for the difference file that allows the difference file to hold information from which to construct a copy of the new file using a duplicate of the old file while occupying the least number of bytes. According to specific embodiments, this difference file is built in a multistep process to minimize the size of the difference file.

The method according to the invention attempts to minimize the size of the difference file by a variety of techniques, any group of which may be incorporated into specific embodiments. According to a specific embodiment, the entire old file, rather than a limited portion of the data, is used as a database. This helps produce a smaller difference file by potentially finding more data to copy from the old file. In general, as much data as possible is copied from the old file, unless it takes fewer bits to insert the data. Copying data from the old file requires only a command code, whereas inserting data requires a command, plus the actual insertion data. The invention makes decisions about whether to copy or insert data by using a search algorithm that can do the following: use a "current positions" pointer into the old file for copying data, which eliminates an explicit position field if data can be copied from the current position; favor copying from the "current position" in the old file; search the entire old file for data not found at the "current position" and if the data is found elsewhere in the old file, copy from that position (unless it "costs more" than inserting enough data to allow the next copy from the "current position"); and insert data if a copy was not chosen.

According to an embodiment, the length of the minimum data string searched for in the old file is selected as "N" bytes and is dependent on where the data is copied from. The copy from current position command uses a shorter minimum data string than copy from another position because it has been encoded to require fewer bits.

According to further embodiments, commands and count fields of the difference file are encoded. Commands may be encoded using a "state machine", where certain commands are implied by the sequence of previous commands, and count fields may be encoded with a "cascaded" count field method. Huffman encoding of smaller count values may be employed to further reduce the difference file size, and counts larger than the Huffman-encoded counts use three progressively larger count fields. The length of these larger count fields is variable for each command type, and is modified based on statistics gathered during the construction of each individual difference file.

According to further embodiments, all command, count and position fields are "bit-packed" to eliminate unused "filler" bits, and redundant data strings are removed from the insertion data before being appended to the difference file. The entire minimized difference file (minimized by the techniques mentioned above) may be finally compressed (using a "well-known" compression algorithm-like "zip"-or proprietary compression technique) to reduce the file size.

According to an embodiment of the invention, execution time of the differencing step is important only in that the difference method should not take an unreasonable time to execute (overnight may be OK in many cases). An index or hash table may be used to speed searching, but is not necessary for the differencing process (and will not be built if sufficient memory is unavailable).

In this patent application, the present invention is described with reference to specific embodiments. It will be understood by anyone skilled in the programming art that many variations on the basic system and method of the present invention are possible within a computer environment. The invention therefore should not be construed as limited except as provided in the attached claims.

For example, conventional computer systems today encode data as a collection of two-state binary units known at bits. Most current computers group these bits into 8-bit groups known as bytes, also referred to as characters. A sequence of bytes or characters is commonly referred to as a string. These terms are used in accordance with their accepted meaning in the art in this application, but it should be understood that the techniques of the invention could be used in different types of computing systems having different means for encoding and organizing data.

Also, within the art, the terms "text" and "string" are sometimes used in a particular way to describe computer encoded alphanumeric data, and at other times these terms are used very broadly to denote a sequence of data values that could represent anything: text, a number, a piece of an image, sound, etc. In the present description, these terms and other terms used in the art are intended to be given their broadest meaning.

DETAILED DESCRIPTION OF THE DRAWINGS

Overview

Figure 1:
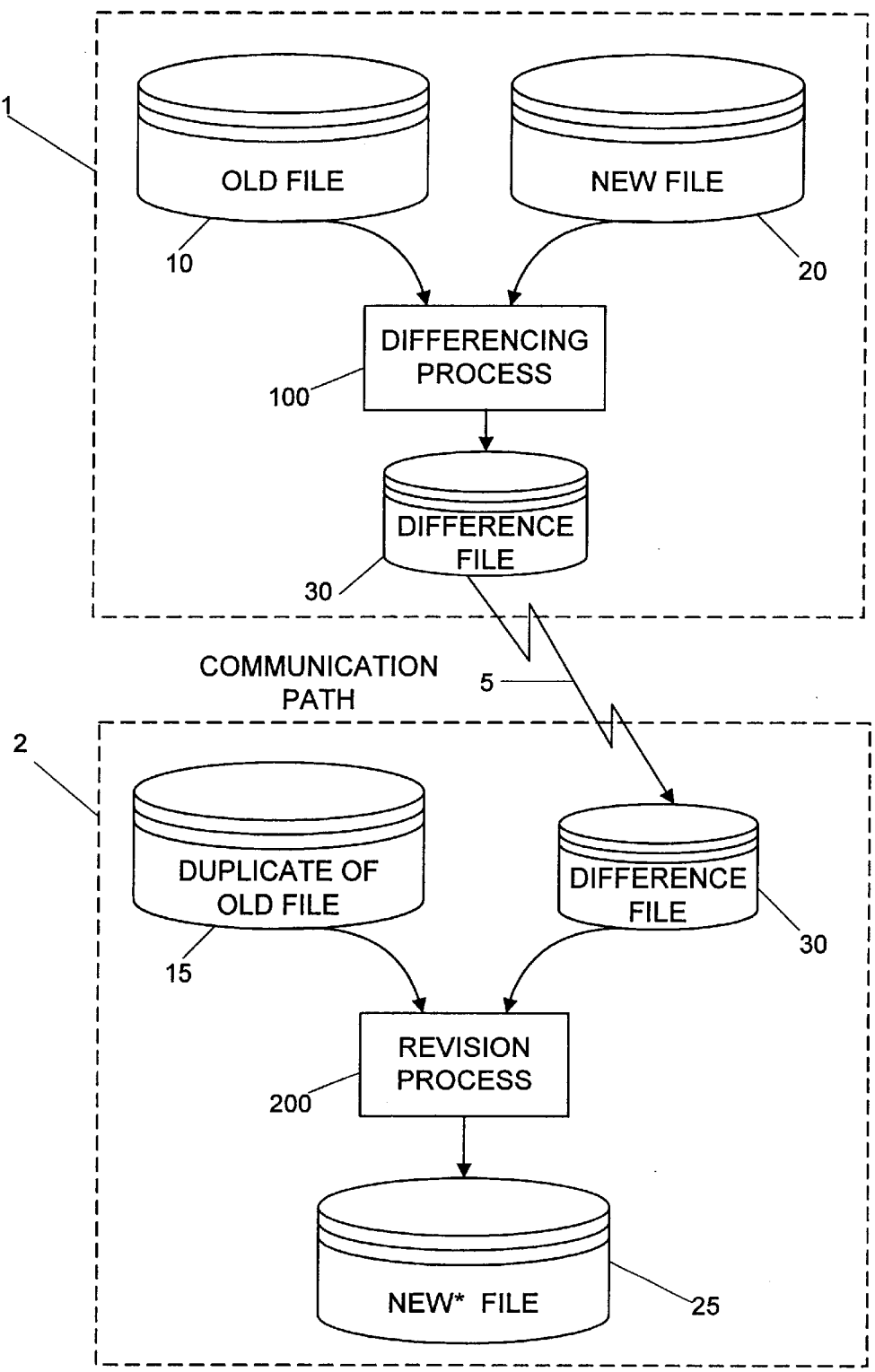
FIG. 1 is a block diagram showing the general differencing and revision process according to the current invention.

An overview of the process according to the invention is illustrated in FIG. 1. FIG. 1 illustrates a first computer system 1 and a second computer system 2 which communicate via a communication path 5. Both computer systems 1 and 2 can be any collection of computing devices operating together whatsoever as is known in the art. Computer systems 1 and 2 can also refer to the same computer system, or components within the same computer system. Communication path 5 may be any means by which a file can be communicated between computer system 1 and computer system 2, including a removable fixed medium such as a floppy disk or CD ROM disk, or a communication medium such as an interoffice network, a telephone line, a bus, or the Internet. Path 5 also might encompass an electronic mail message.

As shown in FIG. 1, computer system 1 includes an old file 10, a new file 20, and a differencing processor 100 which generates a difference file 30. New file 20 is generally somewhat similar to old file 10, containing some changes in data which reflect a revision of new file 20. Old file 10 and new file 20 could be any collection of computer data whatsoever, including an executable application program, an operating system program, a text file, a spreadsheet or other data file, an image file, or any other type of computer-readable data.

Difference processor (DiffIt) 100 reads new file 20 and compares it to old file 10 by a process described below. Difference process 100 then stores indications of the data to be copied from old file 10 or inserted from new file 20 into difference file 30. According to the invention, when new file 20 is a revised version of old file 10, difference file 30 will be substantially smaller than either new file 20 or old file 10, in some cases, only ten percent or less than the size of new file 20.

According to the invention, difference file 30 may then be transmitted over path 5 to computer system 2 where a revision process (RevIt) 200 reads a duplicate 15 of old file 10 and difference file 30 and creates a copy 25 of new file 20 on computer system 2. According to the invention, copy 25 (designated the New* file) is identical to new file 20 created on computer system 1.

Differencing Process Overview

Figure 2:
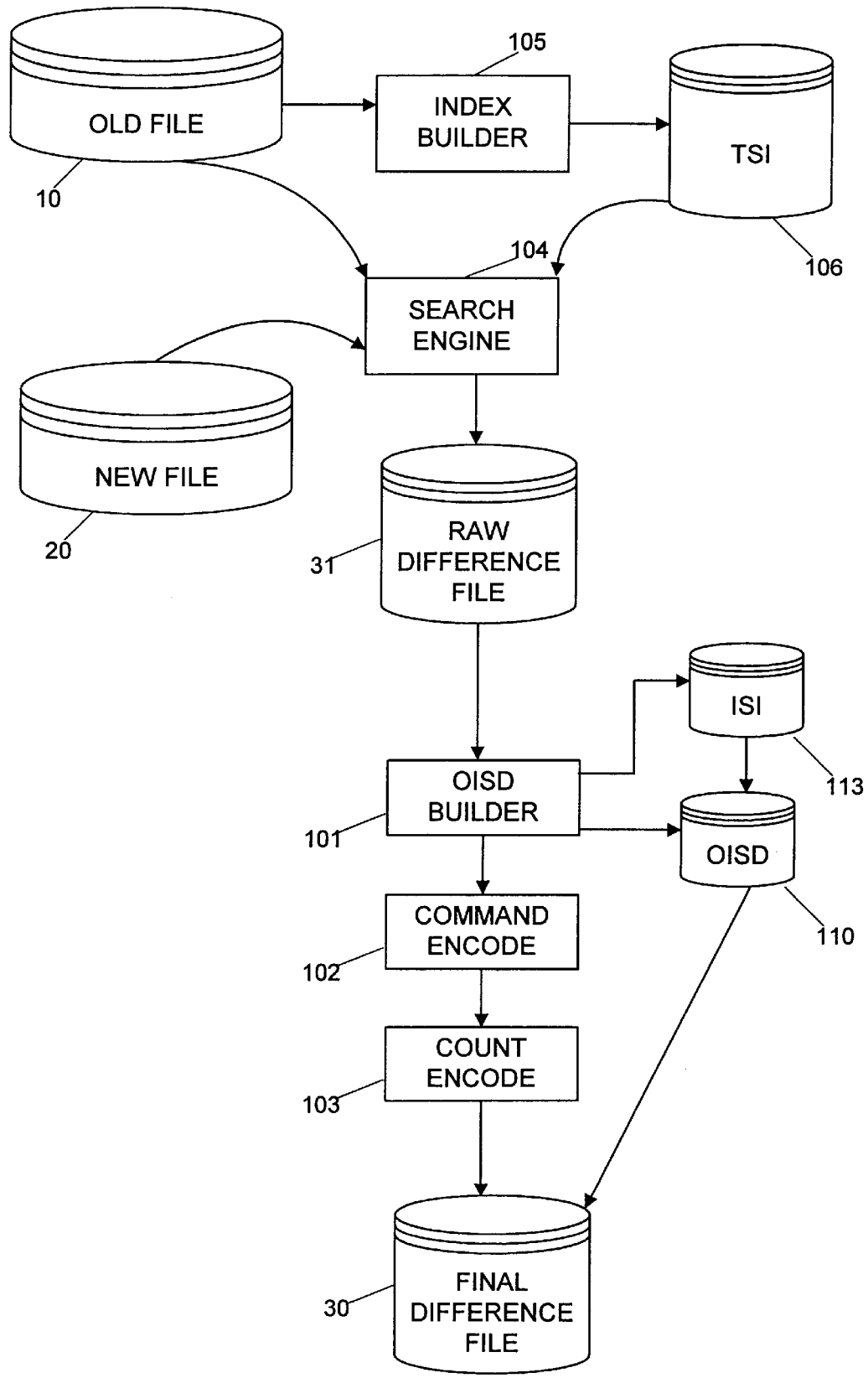
FIG. 2 is a block diagram of a differencing process and its components according to an embodiment of the invention.

FIG. 2 is a block diagram illustrating the process of differencing process (DiffIt process) 100. DiffIt process 100 uses old file 10 and new file 20 to generate difference file 30. An optional index builder 105 may be used to build a text string index (TSI) 106 to speed building the difference file.

Search engine 104 reads strings of data from new file 20 and attempts to locate string matches in old file 10 for each string found in new file 20. If an index 106 is present, it is used by search engine 104 to increase searching speed.

When search engine 104 finds a match in old file 10 for a string from new file 20, it indicates this by placing a copy command into a raw difference file 31 (RawDiff). The copy command includes an indication of where the string is found in 10 and the length of the string. When search engine 104 does not find a match in old file 10 for a string from new file 20, it indicates this by placing an insert command into a raw difference file 31 (RawDiff). The insert command includes the text for the string that was not found in old file 10.

According to an embodiment of the invention, an optimized insertion string database (OISD) engine 101 examines the raw DIFF file 31 to create an OISD 110, using an insertion string index 113. A command encoder 102 and a count encoder 103 encode command codes and count fields into the final difference file 30 which also includes OISD 110.

The details of the operation of the elements shown in FIG. 2 according to specific embodiments will now be described.

Differencing Process Flowchart

Figure 3:
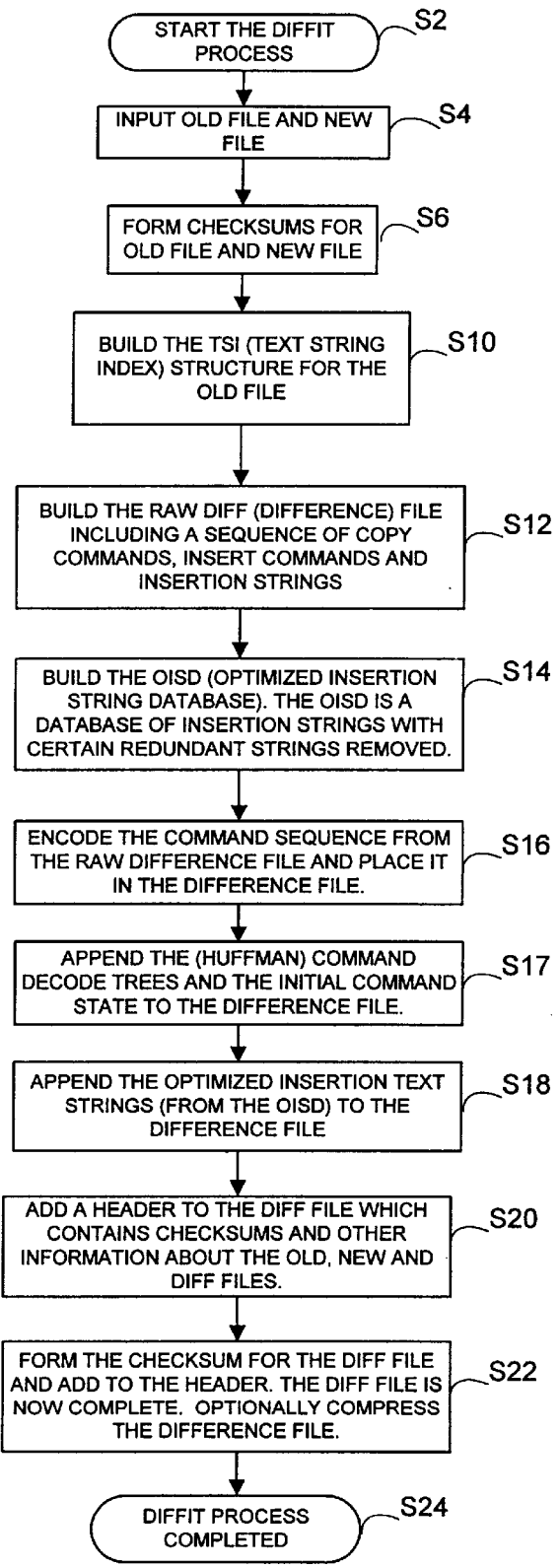
FIG. 3 is a flow chart illustrating a method used by the differencing processor according to the present invention.

FIG. 3 is a detailed flow chart of the operation of differencing processor 100. The process begins (S2) and old file 10 and new file 20 are opened by the processor (S4). Checksums are formed for both the old file and the new file and are stored (S6). The processor then checks to see if there is sufficient memory to create a text string index and if so a text string index (TSI) is built (S10). A raw difference file is created by searching for strings from the new file in the old file, using the TSI if one was created (S12).

After the raw difference file is created, an Optimized Insertion String Database (OISD) is generated from the insertion text and commands in the raw difference file as illustrated in FIGS. 7A, 7B, 7C and 7D (S14). The commands in the raw difference file are encoded to minimize their size (S16) by various possible encoding techniques including a state-machine for command encoding and Huffman encoding for string length values. The encoded commands are then placed in the final difference file (S16). The Huffman decode tables and initial state of the command decode state machine are then appended to the difference file (S17) followed by the OISD (S18). A header is added to the difference file containing the check sums and other information about the old file, the new file and the difference file (S20). Once the difference file is complete a checksum may be formed for the completed difference file and that checksum added to the header (S22). This final difference file may then be compressed using either a proprietary or publicly available compression algorithm (S23). The differencing process is then complete (S24).

Building the Text String Index

Figure 4A:
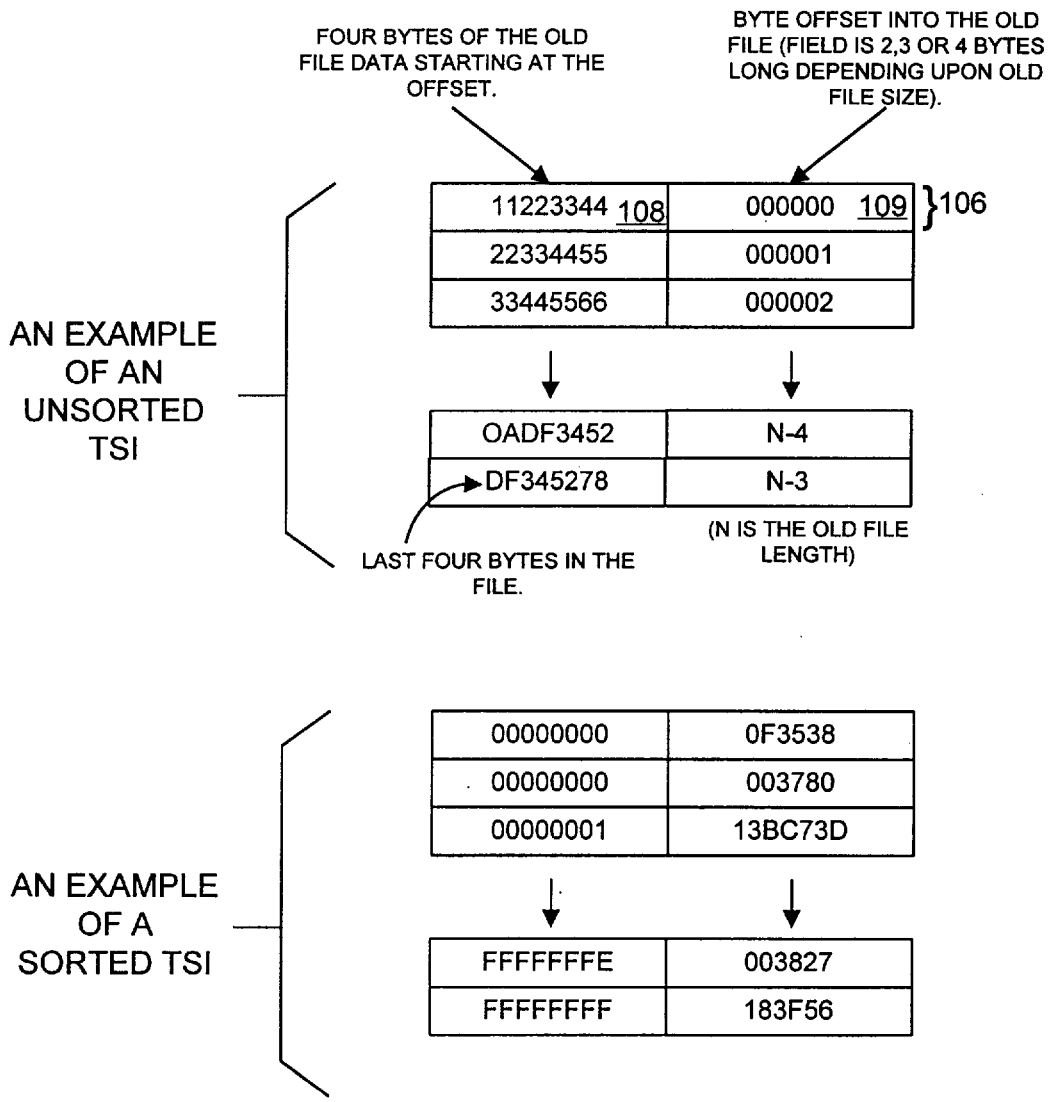
FIG. 4A is a diagram of a Text String Index (TSI) according to one embodiment of the present invention.
Figure 4B:
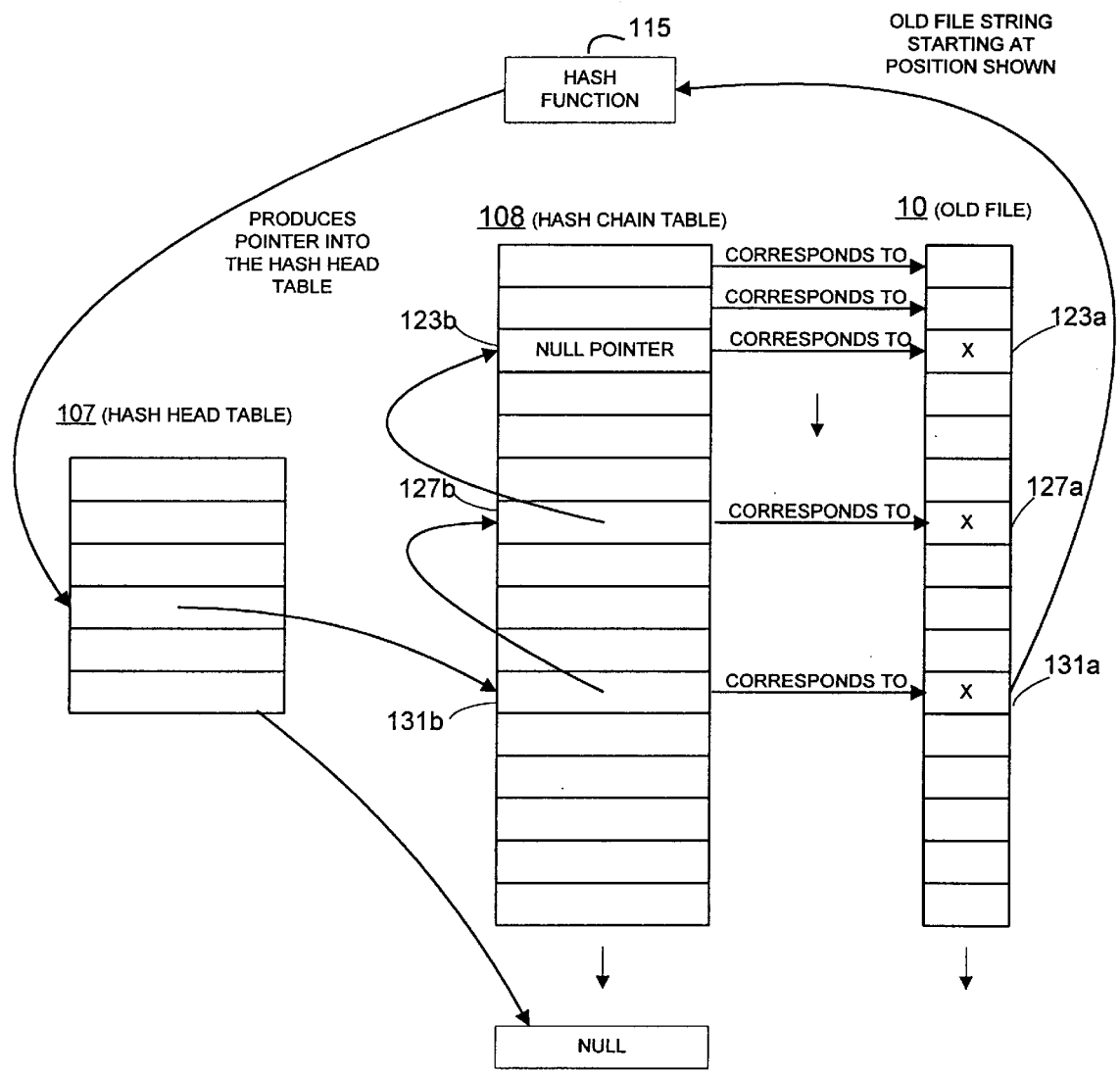
FIG. 4B is a diagram of a hash table TSI according to a preferred embodiment of the present invention.

According to one embodiment, an index builder 105 may be employed to create an index of the old file 10 prior to old file 10 being searched for matching new file strings. FIGS. 4A and 4B illustrate two different examples of text string index (TSI) 106 according to specific embodiments of the invention. The Text String Index (TSI) is a data structure that decreases the search time for text strings in the old file. The TSI is an optional element of the present invention; searching of the old file can take place without one. However, searching will generally be faster if a TSI is created and used.

FIG. 4A shows a very simple index table TSI and FIG. 4B shows a more sophisticated hash table TSI. A hash table is a preferred data structure for the TSI because the search speed is improved and less memory is required. Also, the memory size required for the hash table can be adjusted, allowing improved search times even where only limited memory is available.

A TSI as shown in FIG. 4A is constructed by creating a four-byte entry 106 for each byte in old file 10. TSI entry 106 consists of two parts: a four-byte index 108 and a byte offset 109 into the old file 10. The four-byte index 108 according to an embodiment is simply strings of bytes from old file 10. For each byte position in old file 10, index 108 consists of the four-byte string beginning at that byte position. For every byte in old file 10, a separate four-byte entry is created.

Each entry 106 also includes an offset value 109 which is an absolute indication of the position within old file 10 where the index string is located. After unsorted TSI 106 is complete, according to the present invention, it may be sorted according to index 108. The indexes 108 may contain many duplicate values which are each included in the sorted TSI. The sorted TSI shown in FIG. 4A may be further reduced in size by eliminating duplicate index strings 108 and storing only one copy of index string 108 with multiple positions 109. Once the sorted TSI 107 is complete, it may be used as a simple look-up table to quickly determine the positions within old file 10 of any four-byte string from new file 20.

Building a TSI Hash Table

FIG. 4B is a diagram of a hash table implementation of TSI 106 according to an alternative embodiment of the invention. A hash table is a well-known type of data structure that can be used to speed the searching of a large file of data. In the hash table shown in FIG. 4B, pointers to strings of data in old file 10 are arranged according to the value generated by hash function 115 when that function is applied to the data in that string. Hash function 115 produces an offset value into hash head table 107, where a pointer to a pointer to the string is stored. After the hash table is filled, a particular string can quickly be searched for by applying the hash function to that string and using the value of the hash function to retrieve a pointer to that string. The pointers to strings that generate the same value when hash function 115 is applied to them are chained together so that when strings are searched for, a chain of pointers to all of the matching strings will be retrieved. Chains are created in hash chain table 108 as described below.

One advantage of the hash table implementation is that the structure can be modified to accommodate different amounts of available memory for hash head table 107 by the choice of hash function 115.

Both the hash head table 107 and hash chain table 108 can hold a pointer to any entry in hash chain table 108 or to a NULL value. This pointer is modified as the hash table is filled in order to chain hash chain table entries together. As shown in the figure, each hash chain table 108 entry is permanently associated with a particular location in old file 10.

The hash table is filled before it is used for searching by taking each byte in old file 10, in turn, as the start of an N byte string and passing that string function 115. The size N is set for the entire process and is determined empirically to provide the highest efficiency. In a current preferred embodiment, this string size is five bytes.

The process of filling the hash table to create pointer chains may be best understood in relation to a particular example shown as 131a in FIG. 4B. When the processing reaches byte 131a in the old file, hash function 115 is applied to the five-byte string beginning at byte 131a to give an offset value (in this example four) into hash head table 107. The value at that offset is examined, and if it is NULL, a pointer to an entry in hash chain table 108, in this case 131b, is placed in head table 107. However, if the head table entry is not NULL, as in this example, the value at that head table entry is moved into the hash chain table at the location corresponding to the examined byte (in this case 131b) before a pointer to an entry in hash chain table 108, in this case 131b, is placed in head table 107. In this way, a linked list or chain grows as hash function values from old file 10 are computed.

Hash chain table 108 has as many entries as there are bytes in old file 10 and each entry is wide enough to point to any other entry plus a NULL. Thus 108 will be 2–4 times larger than old file 10, because each entry in 108 is 2–4 bytes wide.

Hash head table 107 has as many entries as necessary, determined by offset values generated by hash function 115 and each entry is wide enough (2–4 bytes) to contain a pointer into any entry in hash chain table 108. The length of 107 may vary and is determined by the amount of memory available. If enough memory is available, the length of 107 is the largest prime number less than or equal to the number of bytes in old file 10. If not enough memory is present, a reduced-size hash head table is constructed with a length equal to the largest prime number times the 107 entry width that the available memory will allow. A reduced-size hash head table will still offer increased search speed compared to not using a TSI.

Hash function 115 is selected to produce a total number of unique values which match the size of head table 107. Hash function 115 takes the five-byte string and produces a value that is a valid offset into hash head table 107. Function 115 may be a number of different functions and is selected to produce a number of different values equal to or less than the available size of head table 107. A requirement of function 115 is that when given the same string, it produces the same value. In general, 115 will map more than one five-byte string to a particular hash head value.

Once the TSI is constructed, if one is used, the processing of building the raw difference file by searching for strings in the old file can begin.

Creating the Raw Difference File

Figure 5A:
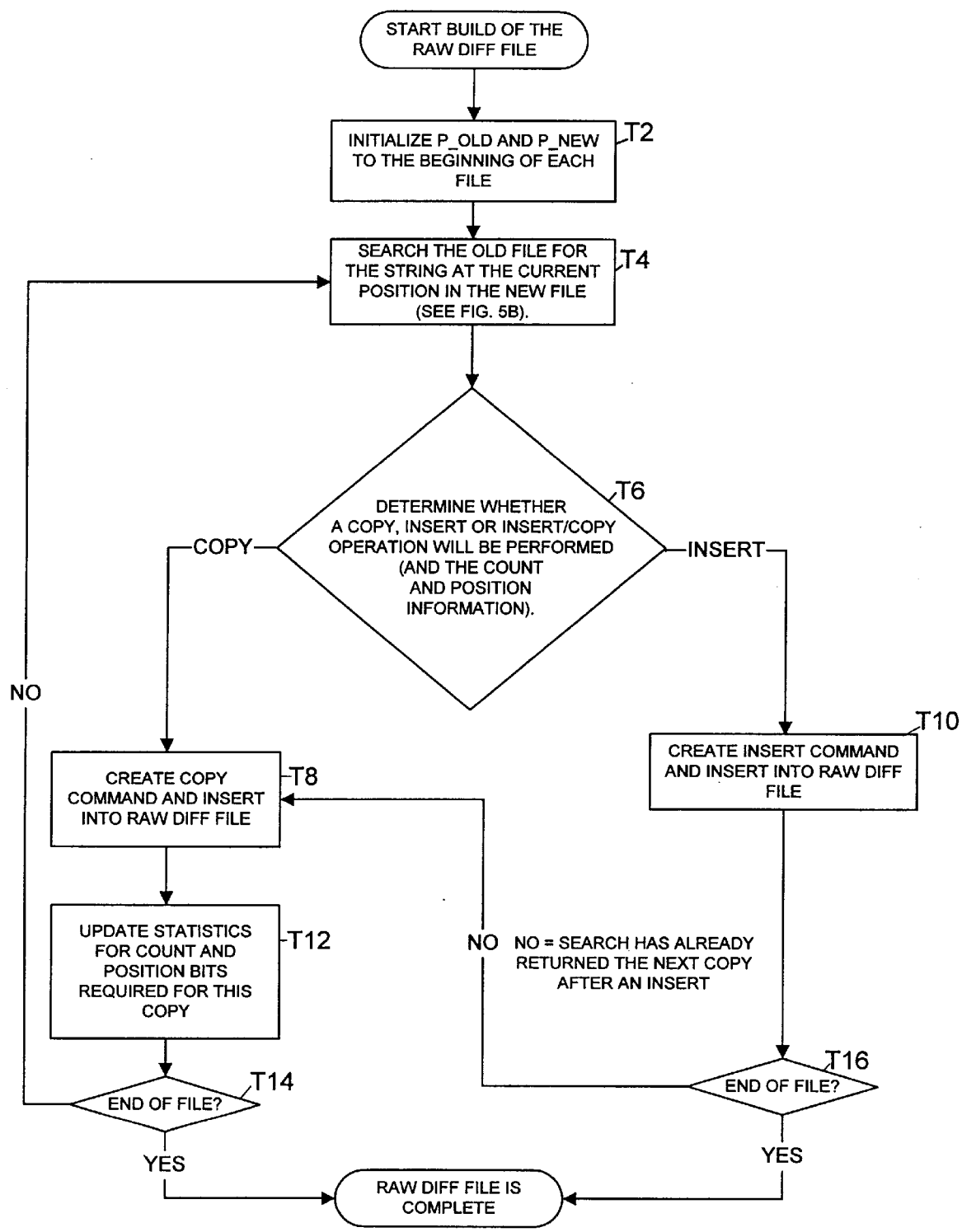
FIG. 5A is a flow chart illustrating a method used by the differencing processor according to the present invention to build the raw difference file.

FIG. 5A is a flow chart of the method of creating the raw difference file according to an embodiment of the invention. In general, creating the raw difference file involves searching for strings of text from new file 20 in old file 10 (T4). When a string is found, a location indication for that string is placed in the raw difference file incorporated into a copy command (T8). When a string is not found, the string data itself must be placed in the raw difference file along with an insert command (T10). Prior to beginning processing of the files, pointers P_OLD and P_NEW are initialized for the two files (T2) and are updated throughout the process.

According to one embodiment, the search function always returns a copy command after an insert command, thus if there is no EOF after an insert (T16), a copy command (T8) is appended to the raw difference file.

Searching for a String

Figure 5B:
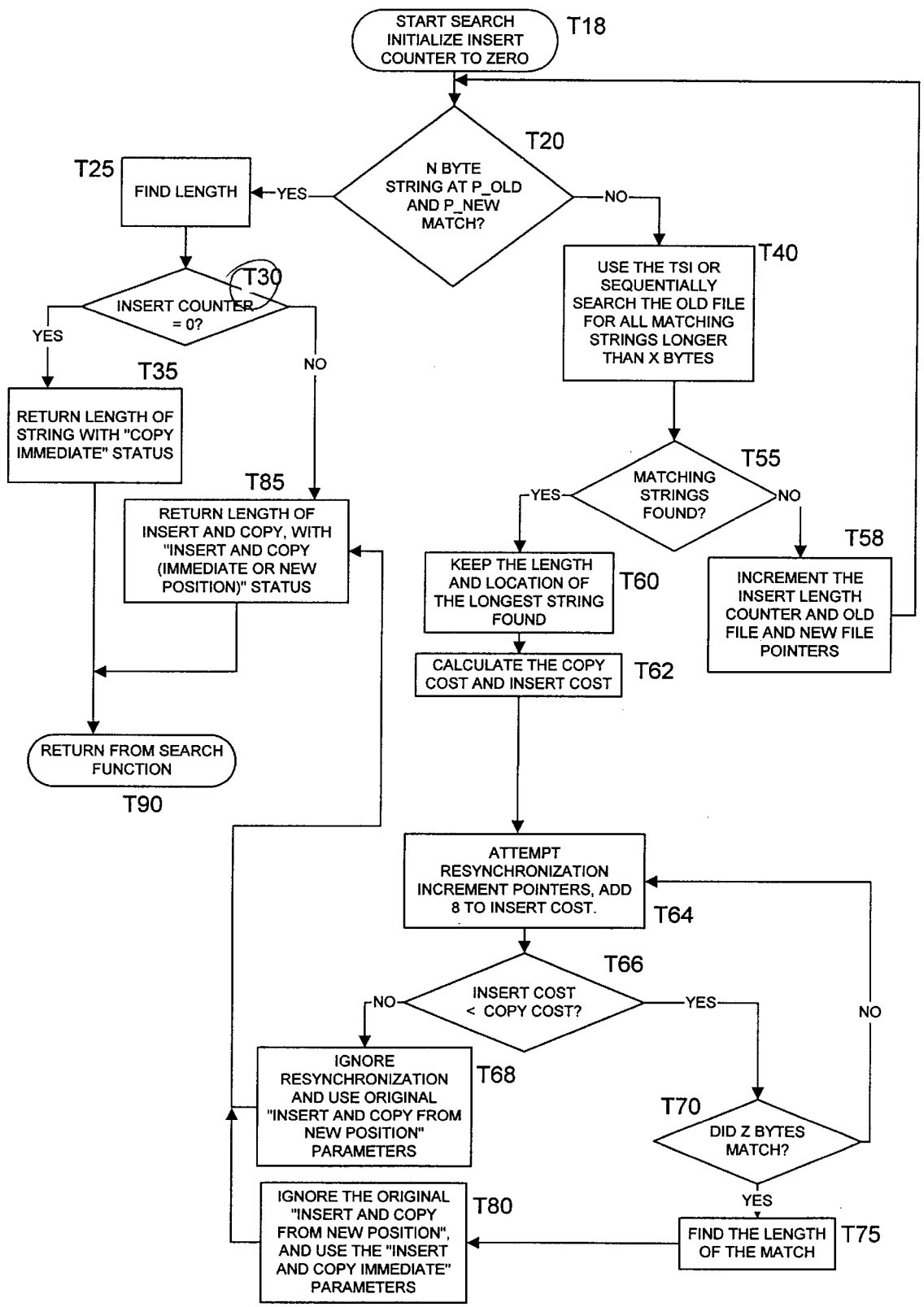
FIG. 5B is a flow chart illustrating a method used by the differencing processor to search for strings in the old file according to the present invention.

FIG. 5B is a more detailed illustration of a search method according to an embodiment of the invention. The goal of the search is to find strings to copy from the old file in order to create a reconstructed new file. In general, copy and insert commands are selected in order to produce the smallest final DIFF file. When choosing between multiple matches on a new file string in the old file, the length of the strings themselves and the length of the required copy or insert commands are all considered.

In general, it is always "cheapest" in terms of code that must be placed in the final DIFF file, to copy strings from the current position of the old file. The current position in the old file is marked by a pointer P_OLD that always points to the end of the last copy. According to specific embodiments, the search code may try a number of variations of copy and insert possibilities, compute the cost of each variation in command and insertion text size and choose the one that is expected to produce the smallest final DIFF file.

According to one embodiment of the invention, it is assumed that there is very little limit to the computing resources that can be devoted to creating the final difference file, as this file will generally only be created once by the distributor of the difference file, and that distributor can generally afford to expend time and memory resources to make the difference file as small as possible. Therefore, very extensive processing may be allowed when creating the difference file in order to minimize the difference file size.

The search method returns one of the following raw DIFF command sequences each time it is called:

1) copy from current position
2) copy from another position
3) insert followed by a copy from the current position
4) insert followed by a copy from another position
5) insert only (Can happen at the end of the file).

Before the search function is called for the first time, pointers are initialized to the beginning of the old and new files (P_OLD and P_NEW). P_OLD is the current copy position pointer in the old file and P_NEW is the current position pointer in the new file. The search process begins when the search function is called from the Build Raw DIFF File function and an insert counter is initialized to zero (T18) for the current search. The X byte string at P_OLD in the old file is compared with the X byte string at P_NEW in the new file (T20) (X in a current specific embodiment is set to 3 bytes, an empirically determined number). If the strings match, then according to the invention a decision is immediately made that a copy from the current position will be the next command, preceded by an insert (T85) if there is any insert text (T30) and the pointers are incremented and comparison continues until the bytes are not equal (T25). Thus, the length of the longest matching string at the current position is found and the search function returns (T90).

If at T20 the strings do not match, then the best match at any copy position in old file 10 is searched for, using a TSI if one was created or otherwise performing a sequential search (T40).

If no matching strings are found, an insert must be performed: the insert counter and P_OLD and P_NEW are incremented by 1 (T58) and then strings at the current position are again compared (T20). This adds one byte to the string that must be inserted from the new file because it was not found in the old file. The path through T58 accumulates bytes to be inserted one at a time using the insert length counter until a suitable copy string is found, either a copy immediate or a copy with offset, as explained below.

If at step T55 one or more matching strings are found, a comparison of bytes past the initial match is conducted and the position and length of the longest matching string in the old file that matches the string in the new file is retained (T60). When a matching string is found in old file 10, the two strings are followed, byte by byte, until the string text from the new file no longer matches the string text from the old file. The method has then found the longest continuous match for that string, starting at that first position where the string was found. According to one embodiment of the invention, the method then looks for other matching strings in the old file and follows each of them until there is not a match. Generally, the longest matching string is kept and a copy command is created and inserted in the raw DIFF file. This copy command includes the location where the longest matching string was found in the old file and the length of that matching string. After the string to be included in the copy command is identified, the pointers to the old and new files are updated.

Calculating the Copy Cost Versus the Insert Cost

After the longest string is found, its copy cost is calculated (T62) and compared to the cost of simply inserting the string. The copy cost is the number of bits required to encode this copy from an old file position other than the current position (generally multiplied by two because it is likely that for the next copy the current position will have to be adjusted back to where the pointer was before the first jump). The insert cost is the number of bits required for the insert command plus the insert text.

The method may then attempt to resynchronize P_NEW and P_OLD (T64). Resynchronizing is defined as inserting bytes one at a time, and incrementing P_NEW and P_OLD in an attempt to line up the old and new files so a copy immediate command can be used. Resynchronizing will increase the insert cost each time a byte is inserted. If the cost of inserting (resynchronizing) becomes greater than the copy cost, the copy will be chosen and the resynchronization attempt is abandoned. In files with relatively small changes, resynchronizing is likely to produce copy immediate commands for very long strings. P_NEW and P_OLD are incremented and eight is added to the insert cost (the bit cost of inserting one byte). The copy cost is compared to the insert cost at step T66.

If the insert cost is greater than or equal to the copy cost, the resynchronization is abandoned (T68). The "insert (with length) and copy from a new position (with length)" parameters from before the resynchronization attempt are returned (T85) to the Build Raw DIFF File function (T90) which called the Search.

If at step T66 the insert cost is less than the copy cost, a check is done to see if at least Z bytes match (T70). (Z is currently set to 3 bytes, an empirically determined number). If Z bytes did not match, the resynchronization attempt continues at step T64.

If at step T70 Z bytes did match, resynchronization was successful. The length of the matching string is determined by incrementing the old and new file pointers and comparing until a mismatch is found (T75). The length of the matching string is saved. The original "insert and copy from a new position" from before the resynchronization is abandoned and the "insert and copy immediate" command will be used (T80). The "insert (with length) and copy immediate (with length)" parameters from after the resynchronization attempt are returned (T85) to the Build Raw DIFF File function (T90) which called the Search.

It should be noted that at step T85 the insert length could be zero (from step T68). This would result in a copy from another position command. Also, at the end of the file an insert with no subsequent copy command may be returned by step T85.

Searching for a String in the Old File Using a Hash Table

If a TSI is present, it is used to search for occurrences of strings from new file 20 in old file 10. As in building the TSI, the new file is processed by examining strings of the same size used to build the TSI and looking up offset positions for those strings.

When the TSI is built using a hash table, hash function 115 or an equivalent is applied to a string to produce an offset into hash head table 107. If the entry at that offset in hash head table 107 is a NULL, the string is not found anywhere in the old file. Otherwise the entry in 107 is a pointer into hash chain table 108. This offset corresponds to the offset into the old file where an instance of the string might be found. Since many different strings may hash to the same entry in the hash head table, the old file string at the offset must be checked for a match.

The method also checks if there is another entry in the chain. If the entry at the offset in 108 is a NULL, there are no more entries in the chain and the search is finished, otherwise the entry is a pointer to the next entry in the hash table, which is treated like the first offset in searching the old file for the string. This chained list search continues until a NULL is found. All strings found are followed to find the longest matching string (T60).

Placing Copy and Insert Commands into Raw DIFF File

Figure 6A:
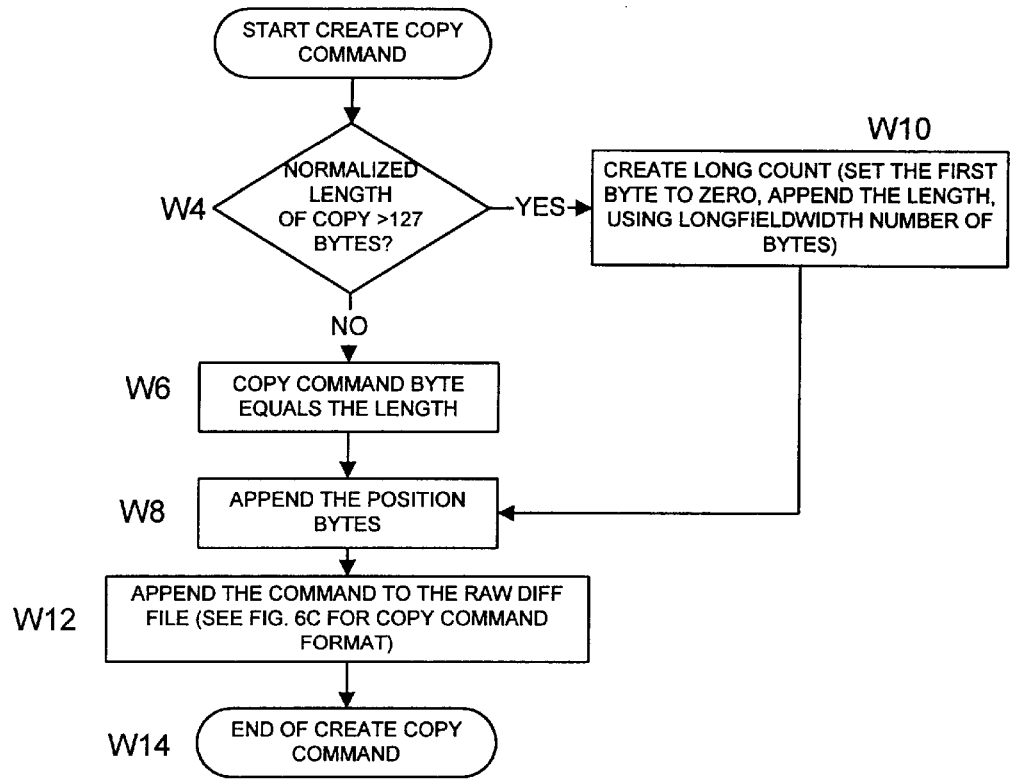
FIGS. 6A–6D show flow charts and command structures illustrating copy and insert commands inserted into the raw difference file according to the present invention.

FIG. 6a is a flow chart illustrating creation of a copy command in the raw DIFF file. According to a specific embodiment of the invention, when a copy command is created the method first checks to see if the normalized length of the string to be copied is going to be greater than a specified value, in a specific embodiment this value is 127 bytes (W4). If not, the copy command byte is set to equal the length of the string to be copied (W6). If so, a long count is created by setting the first byte to zero and appending the length using a LongFieldWidth number of bytes (W10).

In either case, the position bytes are appended to the copy command (W8), and the copy command is appended to the raw DIFF file (W12) and the process ends (W14).

Figure 6B:
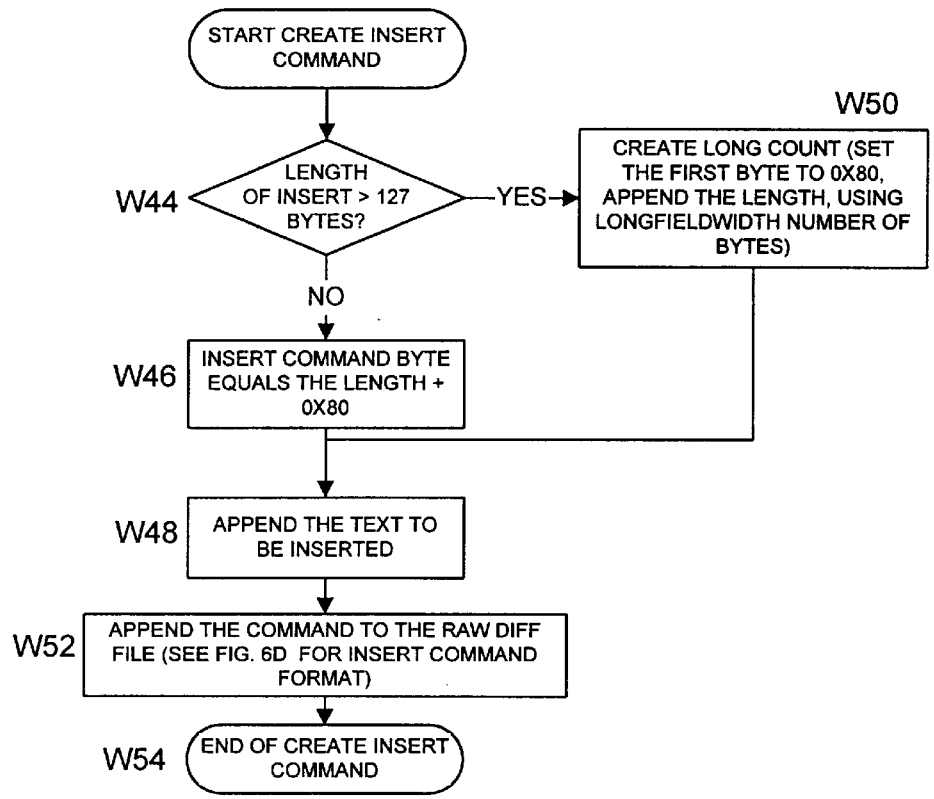

FIG. 6b is a flow chart illustrating creation of an insert command in the raw DIFF file. According to a specific embodiment of the invention the method first checks to see if the length of the string to be inserted is greater than a specified value, in a specific embodiment this value is 127 bytes (W44). If not, the insert command byte is set equal to 0×80 plus the insert byte length (W46). If the length of the string to be inserted is greater than the specific embodiment value of 127 bytes, a long count is created by setting the first byte to 0×80 and appending the length of the insert string (W50). The text to be inserted is then appended to the insert command (W48), and the insert command is appended to the raw DIFF file (W52) and the process ends (W54).

Figure 6C:
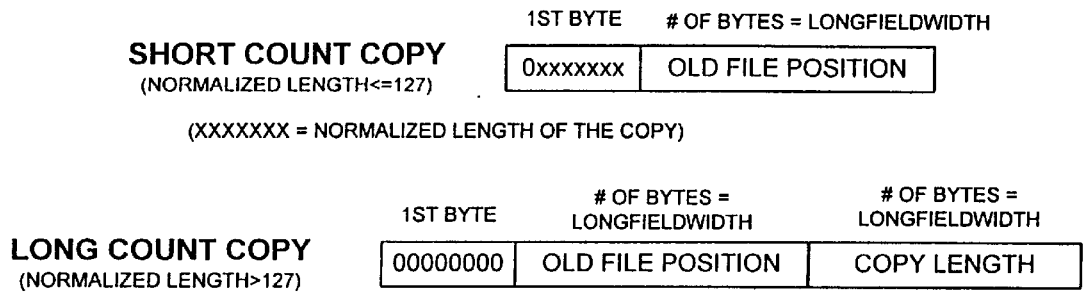
Figure 6D:
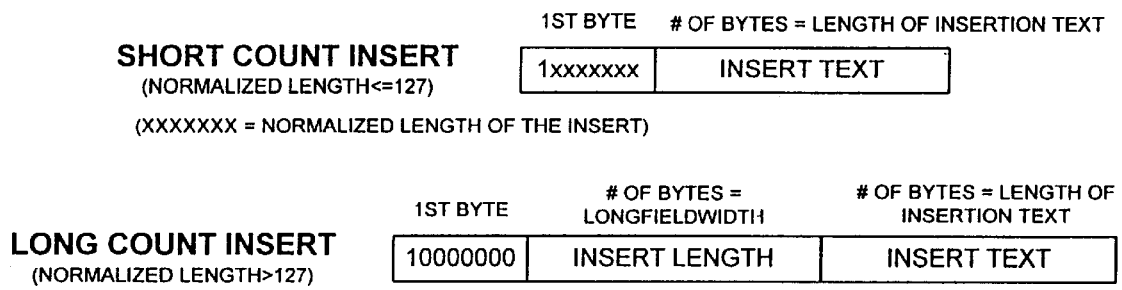

FIGS. 6C and 6D illustrate copy and insert command formats in the raw difference file according to an embodiment of the invention.

Creating the Optimized Insertion String Database (OISD) NEEDS WORK

The raw difference file, once completed, contains pointers (within the copy commands) to all strings in old file 10 that are found in new file 20. It also contains the actual text for any string in new file 20 that is not found anywhere in old file 10. According to an embodiment of the invention, the raw difference file is further processed to generate a final difference file which is smaller than the raw DIFF file. According to a further embodiment of the invention, because the new file is no longer needed to construct the difference file, the memory in which the new file had resided is used for further processing.

Minimizing the raw difference file to create the final difference file involves several important steps. In one step, all insertion text within the raw difference file is gathered together and indexed and optimized into an Optimized Insertion string Database (OISD) and the insert commands followed by text within the raw difference file are replaced by pointers to strings in the OISD. In another step, commands and string length counters in the raw difference file are encoded to minimize the number of bits needed to store them in the final difference file.

Construction of the OISD will be described first. The OISD is used to eliminate redundancies in insertion string text in the raw difference file that may occur when for example, the same three-word string is inserted at many different places. Conversion of the raw difference file into a file including an OISD takes place in four primary steps:

1. Creating an insertion string index (ISI)
2. Creating an OISD
3. Resolving all pointers in the ISI to text in OISD
4. Using the raw difference file to construct insert commands either from a current position in the OISD or from an absolute position in the OISD and placing those insert commands in the final DIFF file.

Figure 7A:
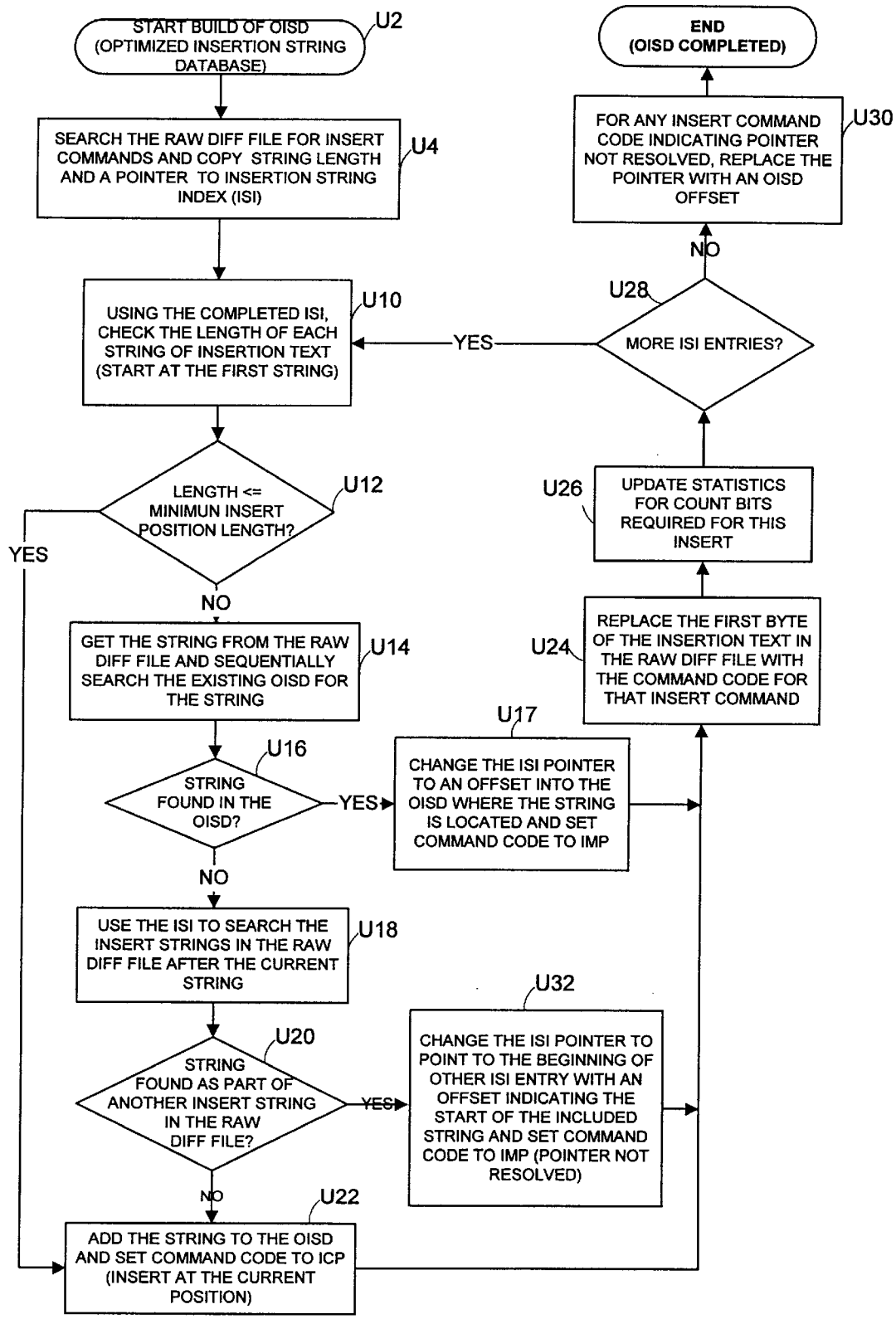
FIGS. 7A–7D show a flow chart and index and file structures illustrating creating the optimized insert string database for including into the final difference file according to the present invention.

FIG. 7A is a flow chart of the process of creating an OISD. The raw difference file is searched for insert commands (U4). Each insert command that is found is copied into an insertion string index (ISI) as a string length and a pointer to the string in the raw difference file.

After the ISI is complete, each insert command is examined in turn. First, the length of the insert string is checked (U10, U12), and if it is less than or equal to a particular value, the minimum insert position length (empirically set to a value of two in this embodiment), then the insert string is copied into the OISD and a command code indicating an "Insert at Current Position" (ICP) (U22) is placed into the first byte of the insertion string in the raw difference file (U24).

If the string length is greater than the minimum insert position length, the entire insert string is retrieved from the raw DIFF file and the existing strings in the OISD are sequentially searched for the string (U14). If the string is found in the OISD (U16), then the ISI pointer to the string in the raw difference file is changed to an absolute offset into the OISD and a command code indicating an "Insert at Moved Position" (IMP) (U17) is placed into the first byte of the insertion text for this insert in the raw difference file (U24).

If the string is not found in the OISD then the ISI is used to search for the insertion strings in the raw difference file within strings not yet copied into the OISD (U18). If the string is not found as part of another string in the raw difference file (U20), then the string is copied into the OISD and a command code indicating an "Insert at Current Position" (ICP) (U22) is placed into the first byte of the insertion text for this insert in the raw difference file (U24). If the string is found as part of another string in the raw difference file (U20), then the ISI pointer to the string in the raw difference file is changed to point into the ISI entry for the insert string which contains the present string (U32). An offset into this string is placed in the ISI indicating where in the second string the first string begins and a command code indicating an "Insert at Moved Position (IMP)—not yet resolved" (U32) is placed into the raw difference file (U24). The ISI pointer created in U32 will be resolved into an offset into the OISD in step U30, after all the insertion strings are placed in the OISD. This method effectively eliminates redundant strings by finding "strings within strings."

Figure 7B:
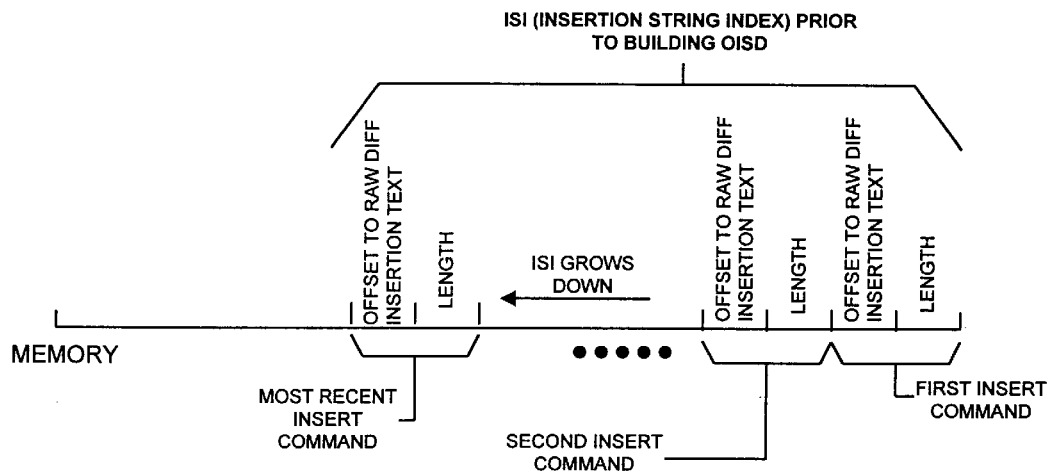

FIG. 7B shows the structure of the insertion string index (ISI) as it is being created but prior to construction of the OISD. Initially, the ISI contains pointers to insertion text strings in the raw DIFF file and the length of those strings.

Figure 7C:
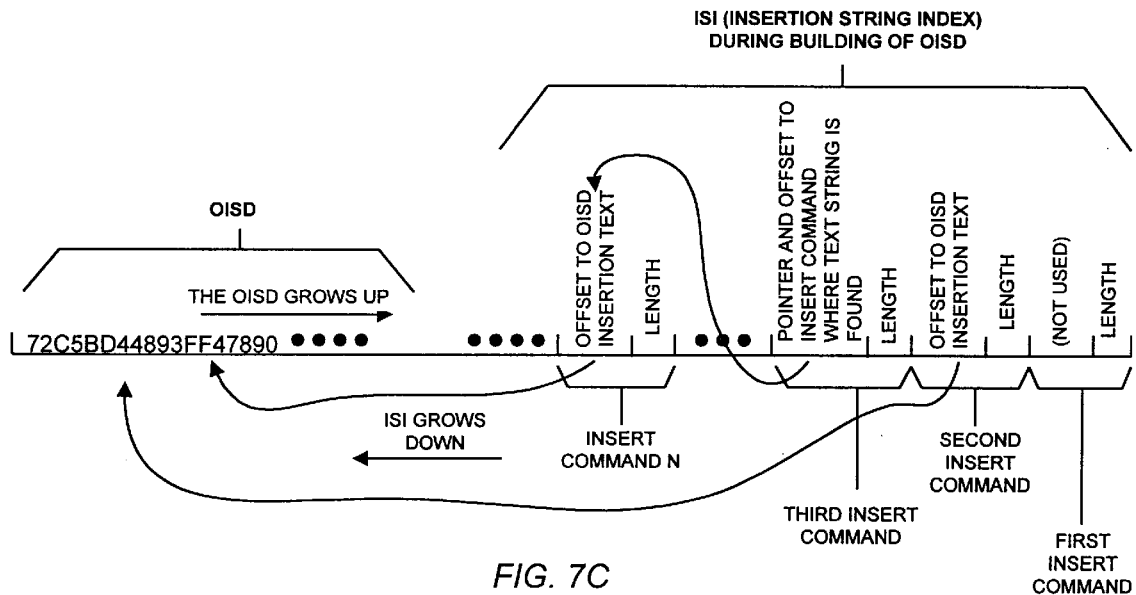
Figure 7D:
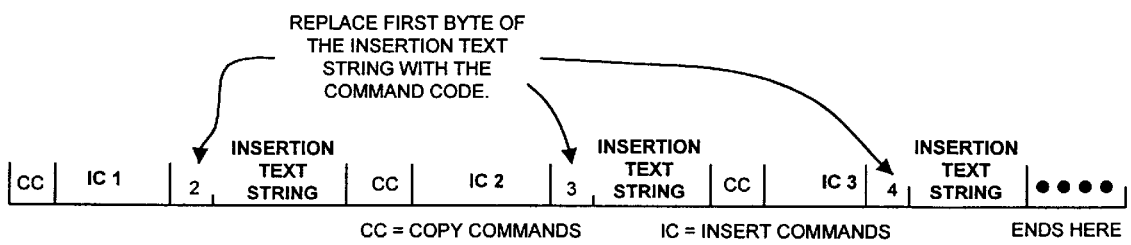

FIG. 7C shows the structure of the insertion string index (ISI) as it is being modified during construction of the OISD, as described above in steps U20 and U32.

While constructing the OISD, three types of insert commands are used to indicate where a text string is found. All three types of insert commands are shown in FIG. 7C. It should be noted that the "insert at Moved Position (IMP) —not yet resolved" command is temporary, and changes to an "Insert at Moved Position (IMP)" command when the pointers in the ISI are resolved. During construction of the new file, a "current position" insert pointer starts at the beginning of the OISD and is moved when "insert from the current position" commands are executed.

The first insert command is an insert from the current position in the OISD. Only the string length is needed for this command; the offset stored in the ISI for that string is not used because the position within the OISD is known.

The second insert command is an insert from an offset into the OISD. The length and offset for the string stored in the ISI are used when creating the command for the final difference file.

The third insert command is an insert from an offset into a text string in the raw difference file that has not had its insertion text moved into the OISD yet. The Offset field in the ISI is changed to a pointer to (and offset into) the ISI offset for the command containing the text string. These pointers are "chained" if text strings are nested "n" levels deep inside increasingly larger text strings.

During the final stage of command encoding (U34), the multiple nested pointers and offsets in the raw DIFF file are each resolved to single absolute offsets into the OISD.

The Final Difference File and Encoding Commands

Figure 8A:
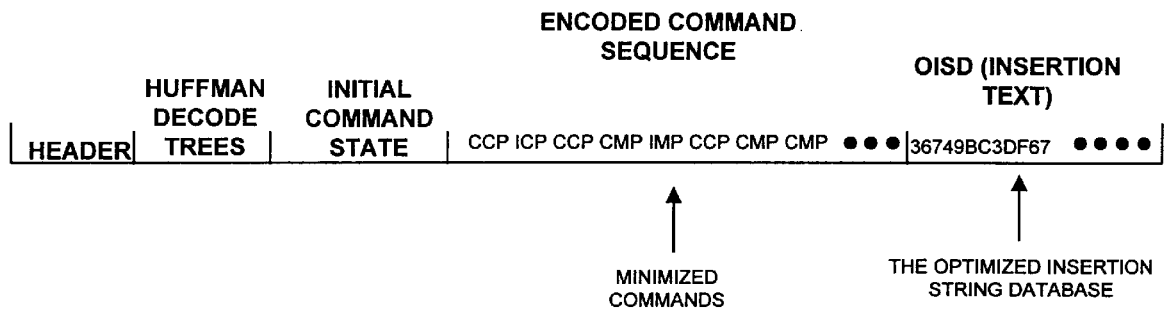
FIGS. 8A–8B illustrate the file structure for the final difference file and a state machine and command format for command encoding in the final difference file according to an embodiment of the present invention.

FIG. 8A is a diagram showing the structure of the final difference (DIFF) file according to an embodiment of the invention. As shown in FIG. 8A, a final DIFF file contains a header, a set of Huffman decode trees, an initial command state to initialize the command state machine, an encoded command sequence, and the optimized insertion string database containing the insertion text. The final difference file is constructed by moving through each command in the raw difference file in sequence. For copy commands, the commands are encoded according to the state machine and encoding fields discussed below. For insert commands, all pointers including nested and unresolved pointers into the OISD are resolved into absolute pointers in the OISD and the OISD is appended to the end of the final difference file. For all commands, count values may be encoded as discussed below.

In the command section of the final DIFF file, there are four possible commands: CCP (copy from the old file at current old file position, P_OLD), CMP (copy move position: copy from the old file at a specified absolute position in the old file), ICP (insert from the OISD at the current OISD position, P_I), and IMP (insert move position: insert from the OISD at a specified absolute position).

Each of these commands may be represented as beginning with two fields: a command encoding field (CE), which can be from zero to two bits wide, and a Huffman encoded count field (HE) which encodes one of twenty different values representing counts associated with a command.

Each command also may contain up to three additional fields: a short count field (SCF), a long count field (LCF), and a huge count field (HCF). At least one of these three fields is present when a count value that cannot fit into the HE field must be stored along with a command. The SCF field is only present if there is an escape code of zero in the HE field, the LCF is only present if there is an escape code in the SCF field, and the HCF is only present if there is an escape code in the LCF field. Encoding of the count fields is described more fully in the next section.

The CMP and IMP commands also include a mandatory third field that contains an absolute offset (AO). In the case of the CMP command, the absolute offset is into the old file, and in the case of the IMP command, the absolute offset is into the OISD. The AO width is set for CMP and IMP to be wide enough to specify any position in the old file or in the OISD respectively.

The four commands can be represented as shown below, with fields that may not be present shown in square brackets:

CCP: CE HE [SCF] [LCF] [HCF]
CMP: CE HE [SCF] [LCF] [HCF] AO
ICP: CE HE [SCF] [LCF] [HCF]
IMP: CE HE [SCF] [LCF] [HCF] AO

Figure 8B:
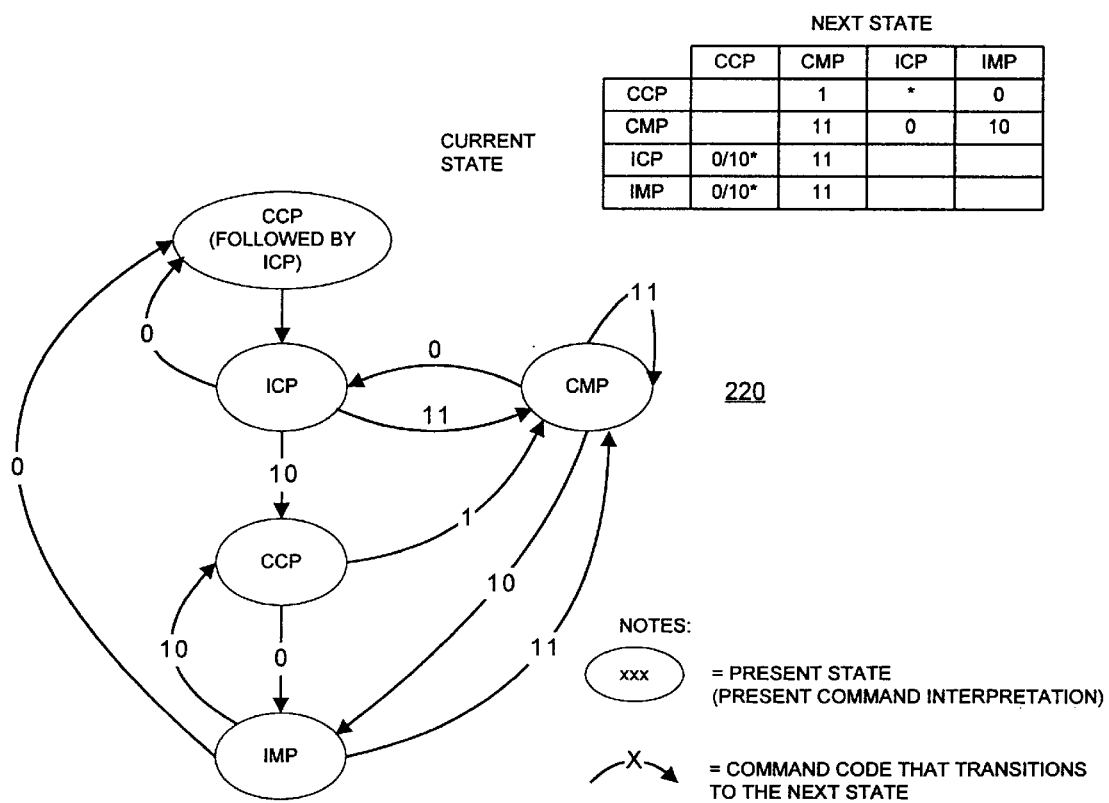

FIG. 8B shows a state machine 220 which indicates how the command fields (CE) are encoded according to one specific embodiment of the invention. As can be seen in the figure, commands are encoded using a no bit, one bit or two bit encoding field, depending on which command they immediately follow. Only one or two bits are required to encode the commands, with the special case of CCP followed by ICP requiring only one bit. The [SCF] [LCF] [HCF] fields are encoded as described below.

Encoding Count Fields

Associated with every command is at least one count field specifying the length of the string to be copied or inserted, which may be encoded to further minimize the size of the final difference file. According to an embodiment, for each of the four command types, different count (string length) frequency statistics for each different command type are gathered during the construction of the raw difference file. These statistics are used to select count value encodings that will minimize the final difference file.

The smallest twenty normalized count values for each command are used to construct a Huffman encoding table (or tree) as is known in the art. The Huffman tree assigns the smallest bit code to the most frequent count value.

Frequencies for values greater than the smallest twenty normalized values are categorized by how many bits it takes to encode them. Using these frequencies, the lengths of [SCF] [LCF] [HCF] are selected to minimize the total number of bits required to encode all the commands (for each command type).

Each command type has a minimum number for its count value based on the process used to construct the raw difference file as discussed above. The minimum number for CCP=3 (because that is the minimum size string looked for in the old file), CMP=5 (because if the copy string is less than S and insert command is selected), ICP=1, IMP=3. These numbers are set before raw difference construction and are empirically derived. Count values are always normalized before being encoded in a count field with a normalized count value having a minimum value of one. This is accomplished by decrementing the count value by the capacities of all leading count fields plus the minimum count value, minus one.

Count encoding for any command type involves the same process, with the only differences being the minimum count values and the short, long and huge field widths, which may be different for each command. Count encoding is performed as follows:

1. The count value is decremented by the minimum count value for that command minus one.
2. If the count value is less than or equal to the capacity of the Huffman field, it is encoded in the Huffman field and the process stops; otherwise, the Huffman escape value is encoded in the Huffman field.
3. The count value is decremented by the capacity of the Huffman field.
4. If the count value is less than or equal to the capacity of the short field, it is encoded in the short field and the process stops; otherwise, the short field escape value is encoded in the short field.
5. The count value is decremented by the capacity of the short field.
6. If the count value is less than or equal to the capacity of the long field, it is encoded in the long field and the process stops; otherwise, the long field escape value is encoded in the long field.
7. The count value is decremented by the capacity of the long field.
8. The count value is encoded in the huge field.

Building the Final Difference File

Once the command count statistics are processed to determine the values of the Huffman tables and the widths of the [SCF], [LCF], and [HCF] fields, the final difference file is constructed by examining each command in the raw difference file in order and using the command encoding state machine shown in FIG. 8A to generate minimized encodings for the commands, the Huffman trees and count widths to encode count fields, and the ISI to resolve insertion pointers. The first command(s) in the raw difference file set the initial state of the encoding state machine. The starting state is saved in the difference file to initialize the state machine for decoding commands during the revision process. The count for the first command is now encoded, using up to the four available fields. If a pointer must be resolved into the OISD, that is done.

According to one embodiment, after each command is encoded, the encoded count bits and position field are packed into the difference file. Packing refers to the technique of storing bits adjacent to one another with no intermediate "filler" bits to make the data line up on even byte or word boundaries.

After the first command is encoded, the next command(s) in the raw difference file is retrieved, encoded using the encoding state machine and packed into the difference file. If this command was a CMP or IMP, the position field is then also packed into the difference file. This process continues until all the commands have been encoded and packed into the difference file. For insert commands the count is retrieved from the ISI. For the IMP insert command, the offset into the OISD is also retrieved from the ISI.

File Revision

Figure 9:
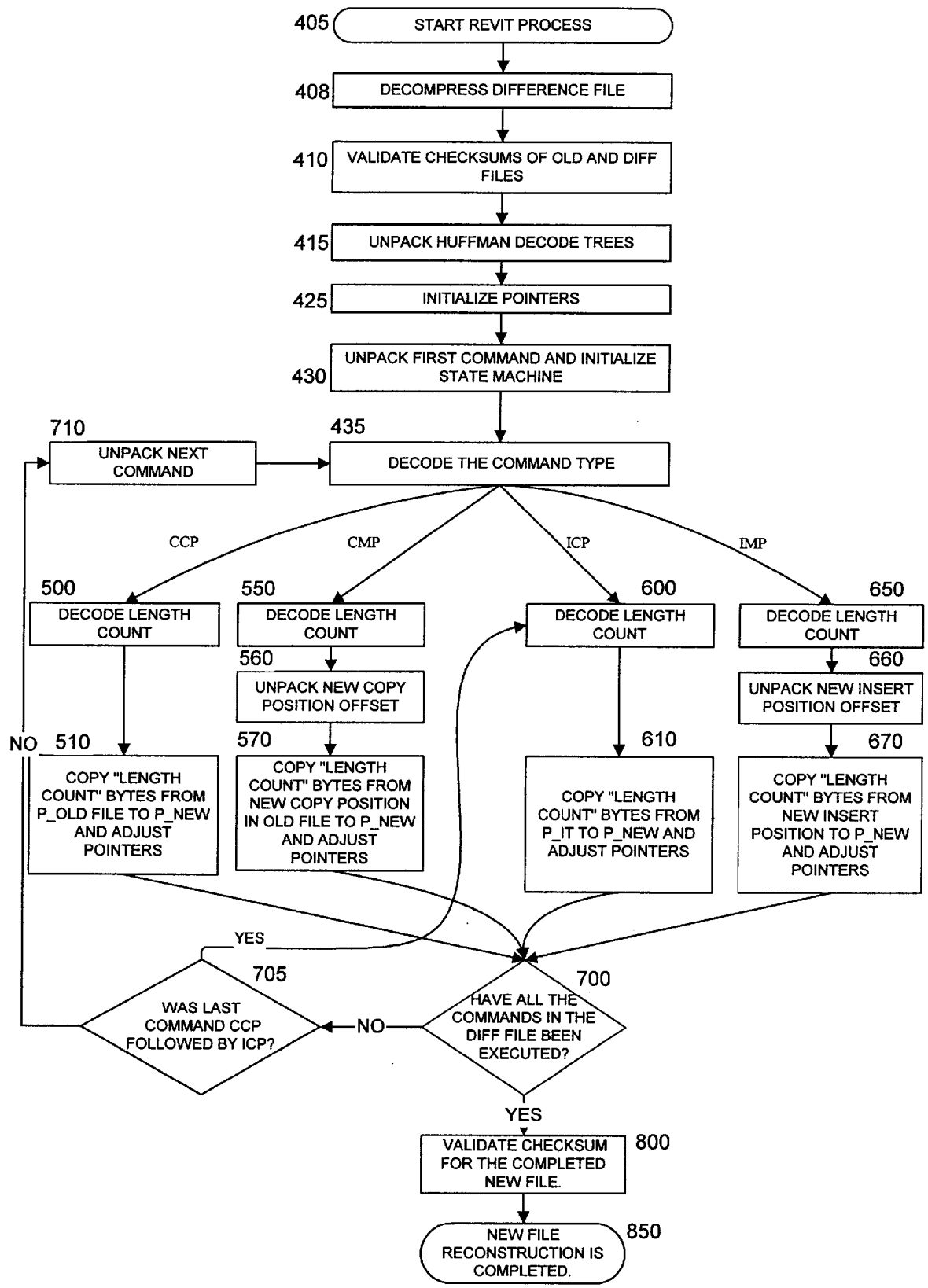
FIG. 9 is a flow chart showing the method of the revision processor according to the current invention.

FIG. 9 is a flow chart illustrating the revision process (RevIt) that occurs in computer system 2 according to the invention. Old file 10 and difference file 30 will be present in system 2, and according to the invention, a duplicate of the new file will be constructed using these two files at system 2. The RevIt reconstruction process extracts copy and insert commands from the DIFF file. The RevIt process executes these copy commands (copying data from the old file to the new file) and insert commands (inserting data from the insert database (OISD) into the new file) to produce the new file. Data is copied and inserted in single or multiple byte lengths, although other embodiments could use nonbyte lengths. Huffman decoding tables in the DIFF file header are used to decode the counts indicating the number of data bytes to be copied or inserted.

The RevIt new file reconstruction process begins when the RevIt program is explicitly or implicitly (via a self-extracting execution file) invoked by a user or other program (405). The difference file is decompressed using the inverse of the compression function applied to the difference file in S22 (FIG. 3). Checksums are computed for the old and DIFF files (410). These old and diff checksum values are compared to checksum values stored in the header area of the DIFF file. If either of the old or diff checksums are not equal to the checksum value stored in the header, the RevIt reconstruction process is terminated with an appropriate error message.

Next, the Huffman decoding tables are unpacked from the DIFF file (415). The Huffman decoding tables are then reconstructed. According to one embodiment, there are four tables, one for each of the command types (CCP, CMP, ICP, IMP). Also unpacked are the different values for the field width lengths for each of the commands.

In step 425, pointers to the first new file location (P_NEW), first insert table location in the DIFF file (P_IT), and first command location in the DIFF file (P_DIFF) are initialized. Strings will be copied or inserted into the new file at P_NEW. Some insert database strings will be retrieved starting at P_IT. Command bits from the difference file are unpacked at P_DIFF.

The first command in the DIFF file is unpacked at step 430 and is encoded in three bits to initialize the command state machine. Subsequent commands are unpacked and decoded as shown in the state machine in FIG. 8B.

Step 435 uses the command state machine to decode the command and then transfers control to the proper one of four command execution paths shown in FIG. 9. As described above, the bit lengths of the short, long and huge count fields (ShortWidth, LongWidth and HugeWidth) for each of the four command types are contained in the DIFF file header and are stored in memory during the RevIt process. The short, long and huge count field bit lengths may be different for each of the four command types and are separately optimized for frequency of counts for command type for each DIFF file created. The absolute offset field AO is set separately for CMP and IMP commands and is set large enough to give an absolute position to anywhere in the old file or OISD respectively.

After step 435, RevIt processing begins similarly for each of the four different commands, with the first step in each case being to unpack the string length width to be copied. In the general case, count decoding is performed as follows:

1. The count value is set to the minimum count value, minus one.
2. If the encoded value of the Huffman field is not equal to the Huffman escape value, it is added to the count value and the process stops.
3. The count value is incremented by the capacity of the Huffman field.
4. If the encoded value of the short field is not equal to the short escape value, it is added to the count value and the process stops.
5. The count value is incremented by the capacity of the short field.
6. If the encoded value of the long field is not equal to the long escape value, it is added to the count value and the process stops.
7. The count value is incremented by the capacity of the long field.
8. The count value is incremented by the number in the huge filed and the process stops.

The specifics of this general case are illustrated to some extent in the figure. For a CCP (copy from current position command), control is transferred to step 500, where the length count of the copy is determined by using the appropriate Huffman table, minimum count value, and short, long and huge field widths for the CCP command, and following the general count decoding process as previously described.

CCP command processing proceeds to 510, with the determined length count number of bytes copied from the old file, starting at P_OLD, to the new file, starting at P_NEW. P_OLD is then incremented by the length count. P_NEW is also incremented by the length count. This CCP processing is then complete.

For a CMP (copy move position command), control is transferred from step 435 to step 550. The Huffman table, minimum count value, and short, long and huge field widths for CMP are used and the length count is decoded as for a CCP command. In step 560, the new copy absolute offset (AO) position is unpacked with a standard field width as found in the DIFF file header. In step 570, "length count" number of bytes are copied from the old file, starting at the AO, to the new file, starting at P_NEW. The current position pointer in the old file is then changed to AO plus the copy length. P_NEW is also incremented by the length count.

For an ICP (insert from current position command), control is transferred from step 435 to step 600. The Huffman table, minimum count value, and short, long and huge field widths for ICP are used and the length count is decoded as for a CCP command. In step 610, "length count" number of bytes are copied from the Insert Database (OISD) in the DIFF file, starting at the current insert position pointer (P_IT), to the new file, starting at P_NEW. The current insert position pointer in the DIFF file OISD is then incremented by the length count. P_NEW is also incremented by the length count. P_OLD is also incremented by the length count.

For an IMP (insert move position command), control is transferred to step 650 and the length count of the insert is determined as for the previous commands using the Huffman table, minimum count value, and short, long and huge field widths for the IMP command. In step 660, the new insert absolute offset (AO) position is unpacked with a standard field width as found in the DIFF file header. In step 670, "length count" number of bytes are copied from the OISD, starting at the new insert position offset, to the new file, starting at P_NEW. P_NEW is incremented by the length count. P_OLD is also incremented by the length count.

In step 700, the command count is decremented. If the command count is zero, the new file reconstruction is complete and control is transferred to 800. Otherwise, more commands must be processed. At 705, if the just finished command is a CCP then it is immediately followed by an ICP command and an immediate execution of the ICP command routine (600) is performed without decoding the next command. Otherwise, control is transferred to 710, where the next command is unpacked and then decoded as just described.

If at step 700 the command count is zero, then new file reconstruction is complete and a checksum is generated from the reconstructed new file. This checksum value is compared with the expected new file checksum found in the DIFF file header. If not equal, an error message or status will be generated. Otherwise, the method process is complete (850).

Computer Product Embodiments

Figure 10:
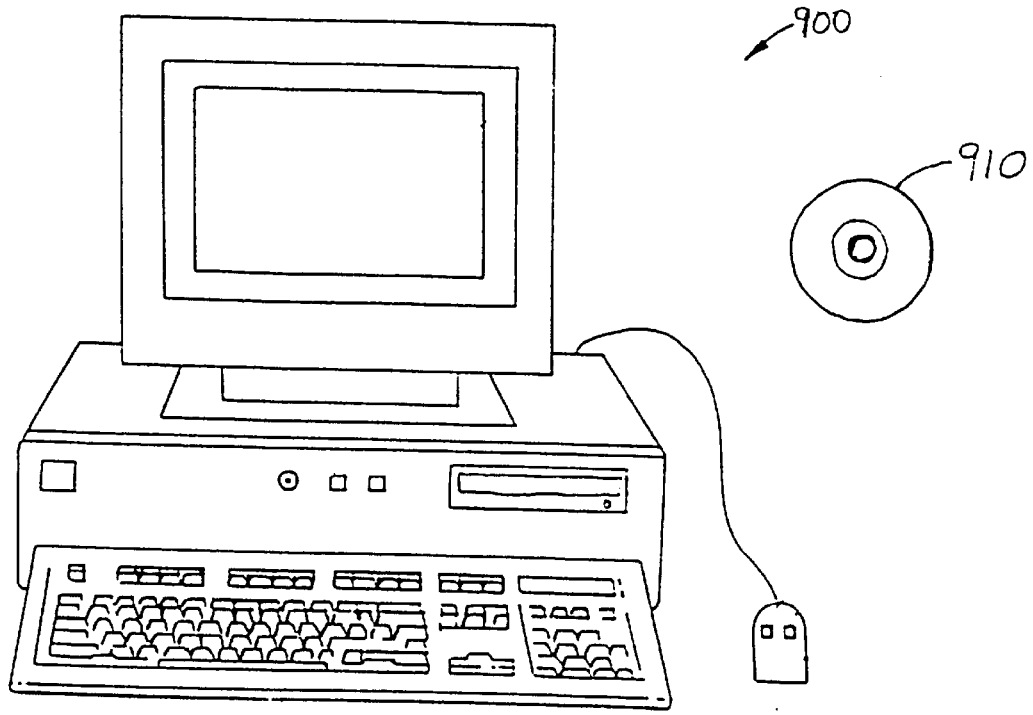
FIG. 10 shows a computer system incorporating the invention.

The present invention may be embodied in a variety of computer products as illustrated in FIG. 10. The invention may be embodied as software running on a computer system such as 900 and used to create difference files for a number of purposes including shipping file revisions to other sites or for archiving. When used for archiving, what is referred to herein as the old file would actually be the file that would be maintained on the computer system, while the difference file would be archived in order to preserve previous versions of the old file.

The present invention may also be embodied in a single difference file stored on a computer storage media of any type, such as disk 910. In such a case, the difference file may be self-extracting, thus requiring no additional executable code to create the revision file, or the difference file may require additional computer code to extract.

The present invention has been illustrated and described herein with reference to specific and preferred embodiments. However, it should be recognized that variations may be made. In particular, a number of optional processings have been disclosed herein, but it should be understood that the invention may be practiced either including or omitting these optional steps. Furthermore, various method steps have been described as occurring within a particular order, but it should be understood that in many cases the order of processing steps can be varied without varying the essential nature of the invention. It is therefore not intended that the invention be limited to the details disclosed herein, but should be accorded the full scope of the claims and any equivalents.

What is claimed is:

1. A method for generating a difference file comprising:
    a) reading new file data strings from a new file;
    b) searching an old file for the presence of old file data strings matching said new file data strings;
    c) when a match is found, storing in said difference file an indication of the position in said old file of said matching strings, along with an indication of a copy operation;
    d) when no match is found, storing said new file data string in a location where it will available to said difference file and storing in said difference file an indication of the location of said insert data along with an indication of an insert operation;
    e) repeating steps a) through d) until all data in said new file has been read and corresponding insert and copy operations have been written into said difference file.

2. The method according to claim 1 wherein data strings from said new file that are searched for in said old file have a fixed and predetermined length greater than one.

3. The method according to claim 2 further comprising establishing a pointer to a current position in said old file for the purposes of minimizing the amount of position information that must be stored with a copy operation when copying from the current position.

4. The method according to claim 1 further comprising, when a match is found, continuing to compare data from said old file to said new file subsequent to said data string in order to maximize the length of said matching string.

5. The method according to claim 4 wherein when a match is found at a location different than the current position, comparing the amount of data that will need to be stored in said difference file for a copy operation versus an equivalent insert operation and choosing the operation that results in the smallest amount of data being included in said difference file.

6. The method according to claim 1 wherein said searching further comprises creating a text string index from said old file if sufficient system memory exists and using said text string index to quickly locate occurrences of said old file data string in said new file.

7. The method according to claim 6 wherein said text string index is implemented using a hash table and a hash function.

8. The method according to claim 1 further comprising:
    f) after said difference file is complete, gathering all new file data stored in said difference into an optimized insertion database in order to reduce redundancies in inserted data.

9. The method according to claim 8 further comprising:
    g) encoding said indications of copy operations and insert operations and position indications in order to reduce the size of said final difference file.

10. The method according to claim 1 further comprising:
    f) storing along with said difference file executable code to perform file revision in order to allow said difference file to be self-executing to generate a copy of said new file from a copy of said old file.

11. The method according to claim 1 wherein said copy operations and said insert operations are stored in said difference file as commands, each comprising a plurality of fields, said fields indicating the command type, the string count, and the position where the string text is found.

12. The method according to claim 11 wherein there are two copy commands and two insert commands having a form:

CCP: CE HE [SCF] [LCF] [HCF]
CMP: CE HE [SCF] [LCF] [HCF] AO
ICP: CE HE [SCF] [LCF] [HCF]
IMP: CE HE [SCF] [LCF] [HCF] AO
with CCP indicating a copy from a current position pointer in said old file, CMP indicating a copy from an offset position in said old file, with ICP indicating a copy from a current position pointer in an insert database IMP indicating a copy from an offset position in said insert database, CE being a field for encoding the command type, HE being a field for indicating very short copy or insert string lengths, [SCF], [LCF], [HCF] indicating a short count field, long count field and huge count field respectively, and being fields that are not present in all commands, and AO being an address offset field.

13. The method according to claim 12 wherein said CE field is determined by a state machine whose state is determined by the previous command.

14. A computer program product comprising:
computer code that:
a) reads data strings from a new file;
b) searches an old file for the presence of old file data strings matching said new file data strings;
c) when a match is found, stores in a difference file an indication of the position in said old file of said matching strings, along with an indication of a copy operation;
d) when no match is found, stores said new file data string in an insert database and stores an indication of the position of said insert data in said insert database along with an indication of an insert operation;
e) repeats steps a) through d) until all the data in said new file has been examined and corresponding insert and copy operations have been written into said difference file; and
a computer-readable storage medium that stores said computer code.

15. A method for producing a reconstituted file from an existing file and a difference file comprising:
a) reading from said difference file commands indicating data strings to be copied from said existing file into a reconstituted file and data strings to be inserted from an insert database in said difference file into said reconstituted file;
b) copying said data strings indicated from said existing file into said reconstituted file; and
c) inserting data strings indicated from said insert database into said reconstituted file.

16. A method for supplying a revised computer file to a user comprising the steps of:
on a first computer system, comparing a revised file to an old file in order to generate a difference file, said difference file being smaller than said revised file;
transferring said difference file to a second computer system, said second computer system containing a copy of said old file that matches the old file on said first computer system; and
using said difference file and said old file on said second computer system to generate a copy of said revised file on said second computer system, said copy of said revised file on said second computer system matching said revised file on said first computer system.

17. The method according to claim 16 wherein said difference file is transmitted from said first computer system to said second computer system over a transmission medium.

18. The method according to claim 16 wherein said difference file is joined with an executable component at said first computer system, allowing said difference file to be self-extracting after transmission to said second computer system.

19. A difference file for creating a revised file from an existing file comprising:
a plurality of copy commands, each copy command including either implicit or explicit position information with reference to an existing file and including copy string count data;
a plurality of insert commands for inserting data from an insert database, each insert command including either implicit or explicit position information with reference to the insert database and including insert string count data; and
an insert database.

20. A difference file according to claim 19, further comprising command decode trees for decoding said copy string and insert string count data.

21. A difference file according to claim 19, further comprising an executable code unit for creating a revised file from said insert database and said existing file.

22. A file differencing system for creating a difference file from an old file and a new file, said difference file containing all the information necessary to generate said new file from said old file, comprising:
means for opening an old file;
means for opening a new file;
an indexer for creating an index from said old file when sufficient memory is detected;
a text string index for storing index fields from said old file along with a position indication;
a sorter for sorting entries in said text string index;
a search engine for searching for strings of data from said new file and looking up the position of those strings of data in said old file; and
a command writer for assembling commands and data into a raw difference file including strings of data from said new file not found in said old file.

23. The device according to claim 22 further comprising:
an insert database builder for reading insert text found in said raw difference file and creating an optimized insertion database that eliminates most redundancies in said insert data; and
a command encoder for encoding said assembled commands and a count encoder for encoding count fields associated with said commands.

24. A method for generating a difference file comprising:
a) reading a new file data string from a new file;
b) comparing said new file data string to an old file data string at a current position in said old file and if the strings match to at least a predetermined string length, determining the length of the match and writing a copy command, preceded by any accumulated insert data with an insert command, into a difference file and returning to step a;
c) searching an old file for the presence of all old file data strings matching said new file data string to at least a predetermined length and returning the longest matching string and storing in said difference file an indication of the position in said old file of said longest matching string along with an indication of a copy operation, preceded by any accumulated insert data with an insert command;

d) when no match is found, accumulating one byte of insert data, incrementing a pointer to a current position in said new and old files, and returning to step a e) repeating steps a) through d) until all data in said new file has been read and corresponding insert and copy operations have been written into said difference file.

25. The method according to claim 24 wherein said searching further comprises creating a hash table text string index from said old file if sufficient system memory exists and using said hash table text string index to quickly locate occurrences of said old file data string in said new file.

26. The method according to claim 24 wherein when a match is found at a location different than the current position, comparing the amount of data that will need to be stored in said difference file for a copy operation versus an equivalent insert operation and choosing the operation that results in the smallest amount of data being included in said difference file.

27. The method according to claim 24 further comprising:

f) after finding a matching string at a position different from the current position, attempting to resynchronize the current position pointers in said old and new files by accumulating insert bytes so that a copy from the current position may be performed.

28. The method according to claim 24 further comprising:

f) after said difference file is complete, gathering all insert data stored in said difference into an optimized insertion database in order to reduce redundancies in inserted data;

g) encoding said indications of copy operations and insert operations using a state machine, and encoding copy and insert count indications using Huffman encoding in order to reduce the size of a final difference file.

* * * * *